United States Patent [19]

Pasko et al.

[11] Patent Number: 4,744,716
[45] Date of Patent: May 17, 1988

[54] METHOD AND APPARATUS FOR TRANSFERRING ELONGATED OBJECTS

[75] Inventors: James J. Pasko, Naperville; Ireneusz W. Baran, Chicago, both of Ill.

[73] Assignee: Maneely-Illinois, Inc., Chicago, Ill.

[21] Appl. No.: 838,457

[22] Filed: Mar. 11, 1986

[51] Int. Cl.[4] .......................................... B65G 59/02
[52] U.S. Cl. .................................. 414/376; 414/112; 414/118; 414/495; 414/748; 414/786
[58] Field of Search ............ 414/112, 118, 417, 422, 414/376, 495, 745, 748, 786; 198/443; 211/59.3; 312/71; 221/190, 254; 271/157, 158, 159

[56] References Cited

U.S. PATENT DOCUMENTS

| | | | |
|---|---|---|---|
| 3,045,846 | 7/1962 | Clark | 414/417 |
| 3,182,816 | 5/1965 | Illo | 414/748 |
| 3,703,232 | 11/1972 | Zbiegien | 221/254 X |
| 4,353,678 | 10/1982 | Gott et al. | 414/748 |

FOREIGN PATENT DOCUMENTS

| | | | |
|---|---|---|---|
| 1247950 | 8/1967 | Fed. Rep. of Germany | 414/745 |
| 3403029 | 8/1985 | Fed. Rep. of Germany | 414/417 |
| 21465 | of 1912 | United Kingdom | 271/159 |
| 854847 | 8/1981 | U.S.S.R. | 198/443 |

*Primary Examiner*—Leslie J. Paperner
*Attorney, Agent, or Firm*—Calfee, Halter & Griswold

[57] ABSTRACT

A method and apparatus for transferring elongated objects includes a transfer cart comprising a vertically movable table top mounted on a mobile base. The transfer cart is selectively reciprocally transferred between a loading station and an unloading station. The table top has cradle means thereon to hold the elongated objects during transfer with the ends of the elongated objects overhanging both ends of the table top. At the unloading station, the table top and elongated objects thereon are raised to an elevated position, and pivotal support arms are extended under the elevated overhung ends of the elongated objects. The table top is lowered to deposit the elongated objects on the extended arms for gravity feed transfer to a work station. The transfer cart with lowered table top is returned to the loading position, and the pivotal support arms after unloading are retracted to provide clearance for raising the table top during the next cycle. Control panels are respectively positioned adjcent the loading station and the unloading station, with the operation of the mobile base, table top and arms being remotely and automatically controlled from either panel.

19 Claims, 3 Drawing Sheets

METHOD AND APPARATUS FOR TRANSFERRING ELONGATED OBJECTS

FIELD OF THE INVENTION

The present invention relates in general to a method and apparatus for transferring elongated objects from one work station to another and in particular to a remotely controlled transfer cart having a vertically movable table top thereon automatically to transfer and unload the elongated objects.

BACKGROUND OF THE INVENTION

Elongated objects such as tubes, pipes and structural members frequently have to be transferred from place to place in manufacturing operations, warehouse operations, assembly operations and construction operations. For example, elongated tube sections may be transferred from the end of a continuous tube making mill to a physically separated painting or surface finishing station.

This type of transfer is typically performed by using a fork truck equipped with fork spreader and slings and/or overhead crane with slings. This type of transfer requires substantial dedication of equipment and manpower to implement the transfers when required.

SUMMARY OF THE INVENTION

In order to minimize equipment and manpower considerations, the principle object of the present invention is to provide a method and apparatus for transferring elongated objects from one place to another with remote, automatic control of the loading, transfer and unloading sequences.

It is another object of the present invention to provide a transfer cart having a vertically movable table top thereon provided with a cradle to confine the elongated objects during transfer but to permit their automatic removal at the unloading station. During transfer, the elongated objects held by the cradle overhang both ends of the table top. At the unloading position, the table top is raised and pivotal arms associated with the unloading station are swung under the overhung ends to support the elongated objects, thereby to permit the table top to be lowered and the transfer cart to be returned to the loading position.

It is still another object of the present invention to provide a transfer method for moving elongated objects from one position to another including the steps of holding elongated objects on a vertically movable table top with the ends of the elongated objects overhanging both ends of the table top, transferring the table top to the other position, raising the table top to an elevated position while holding the elongated objects on the table top, extending arms under the overhung ends of the elevated elongated objects, lowering the table top to leave the elevated elongated objects supported by the extended arms and returning the lowered table top to the first position.

It is still a further object of the present invention to provide a gradual feed of elongated objects from a transfer cart to an unloading or work station. To this end, the vertically movable table top can be elevated slowly to have the tubes thereon sequentially clear one side of the cradle to be fed onto the unloading station.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE PREFERRED EMBODIMENT

Figure 1:
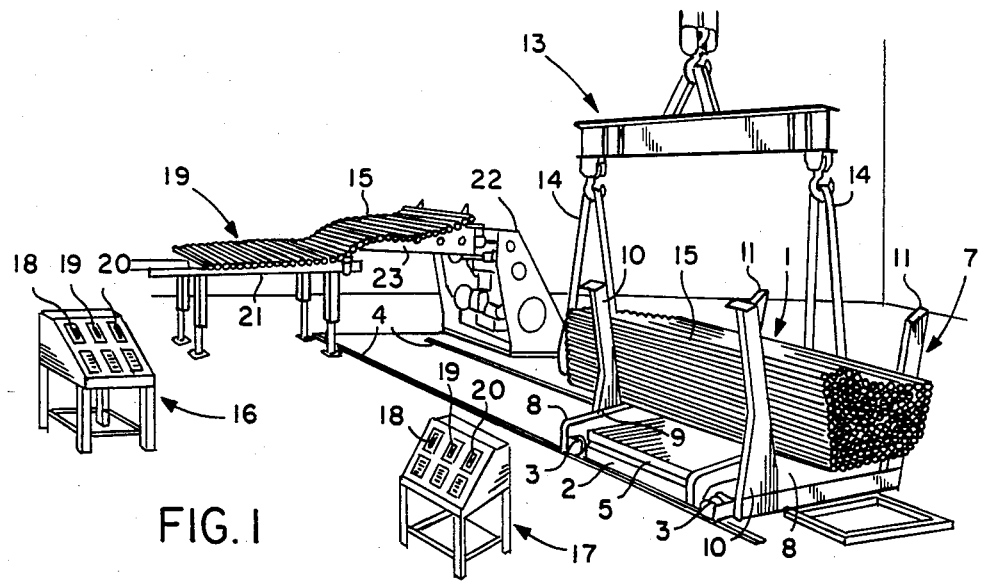
FIG. 1 is a perspective view of the material transfer cart at the loading station with the table top in its lowered position receiving a bundle of elongated tubes.

Referring now in more detail to the drawings and initially to FIG. 1, the transfer apparatus and method of the present invention includes a transfer cart indicated generally at 1. The transfer cart 1 has a mobile base 2, which includes four wheels 3 respectively mounted adjacent its four corners. The wheels 3 ride on and are guided by the two parallel rails 4 forming the transfer track.

Figure 4:
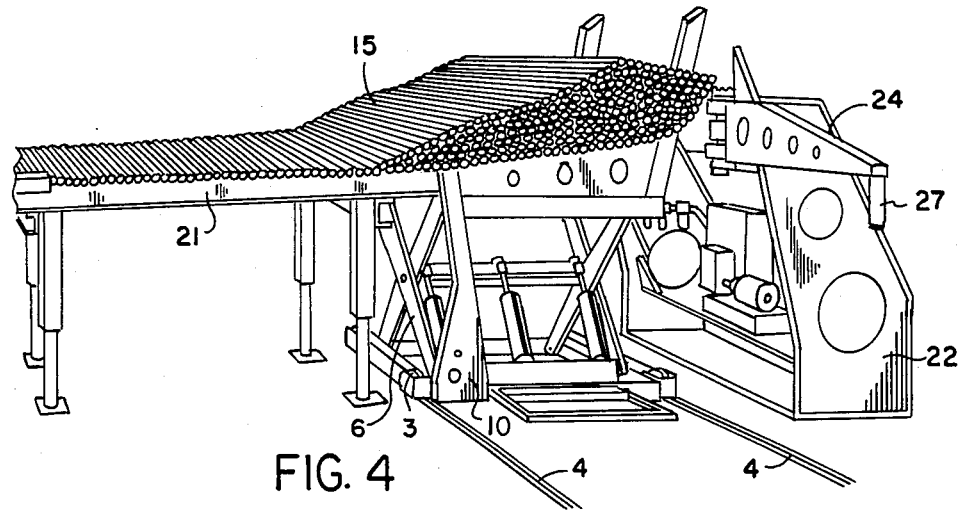
FIG. 4 is a perspective view similar to FIG. 3 but showing the vertically movable table top elevated to position the tube bundle at the end of and slightly above a gravity feed work station.
Figure 5:
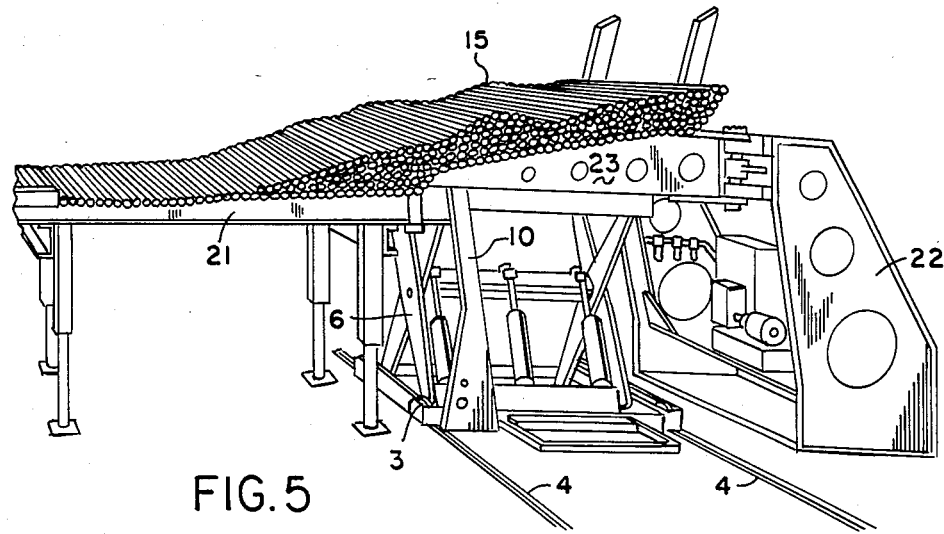
FIG. 5 is a perspective view similar to FIG. 4 with the table top still elevated but showing the pivotal arms swung into their extended position below the overhung ends of the tube bundle.
Figure 6:
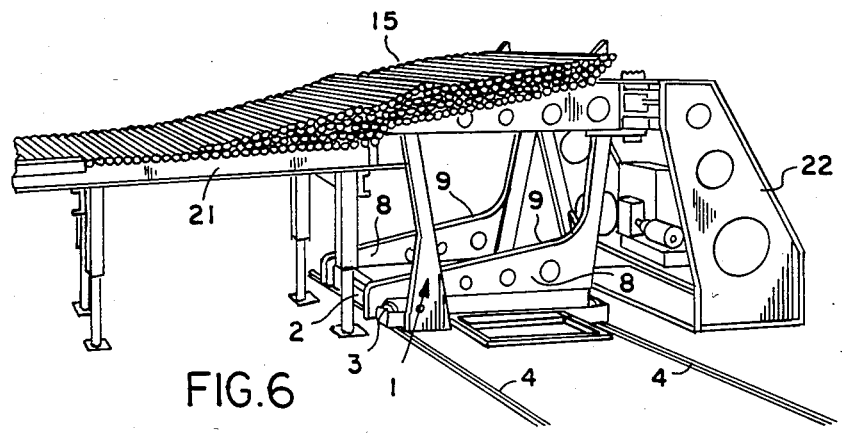
FIG. 6 is a perspective view similar to FIG. 5 showing the vertically movable table top in its lowered position clearing the extended pivotal arms and transferring tube support to the extended arms.

The transfer cart 1 has a vertically reciprocally movable table top 5 mounted thereon and supported thereby. The table top 5 is vertically reciprocally driven by a hydraulically powered scissor jack 6, as best shown in FIGS. 4 and 5. A transfer cart provided with a vertically movable table top is commercially available from several sources including Southford Incorporated of Portland, Me.

The transfer cart 1 and a table top 5 are provided with a cradle, indicated generally at 7, to contain the elongated objects placed thereon during the transfer movement. The cradle 7 includes two spaced, parallel support plates 8 mounted on table top 5. The support plates 8 respectively have commonly inclined upper surfaces 9 slanting upwardly from left to right in the drawings to assist in orienting the elongated objects for feed to the unloading station. The cradle 7 also includes a first pair of upstanding posts 10 mounted to the corners the mobile base 2 on the left side thereof. The cradle 7 further includes a second pair of upstanding posts 11 on the opposite, right side of the cart. The upstanding posts 11 are mounted on the table top 5 adjacent its ends and are vertically movable with the table top.

The respective pairs of upstanding posts 10 and 11 diverge slightly outwardly from bottom to top and cooperate with the support plates 8 to define the cradle receiving the elongated objects. The inclined surfaces 9 of support plates 8 are respectively merged into the upstanding posts 11 with a radius 12 (FIG. 7) to assist in orienting and unloading the elongated objects. The height of the pairs of arms 10 and 11 is coordinated with the work unloading station cooperatively to permit an automatic transfer therebetween as described in more detail below. The length of the cart 1 and the spacial longitudinal separation between the respective posts is shorter than the length of the elongated objects being handled.

As shown in FIG. 1, the loading station of the elongated cart is under the overhead crane bay to permit elongated objects easily to be loaded onto the mobile cart. Alternatively, the loading station could be at the end of the tube mill or other process line, with the tubes being fed directly onto transfer cart 1. As shown, the overhead crane, indicated generally at 13, has two slings 14 at opposite ends thereof. To load a bundle of elongated tubes 15 onto cart 1, the slings 14 respectively surround opposite ends of the tube bundle to permit the same to be lowered into the cradle 7 of transfer cart 1. The tubes 15 are supported by spaced base plates 8 and contained by upstanding posts 10 and 11 on opposite sides of the tube bundle. The tube ends overhang each end of transfer cart 1. With the tube bundle received on the transfer cart, the slings 14 are manually removed from the ends of the bundle as shown in FIG. 1. The loaded transfer cart 1 may then be transferred along the track to the unloading station on command.

For this purose, a control panel 16 may be positioned at the unloading station, and a parallel control panel 17 may be positioned at the loading station. Each of these control panels includes a three way switch 18 to control movement of the cart between the loading and unloading positions, a three way switch 19 to control raising and lowering of the table top and a three way switch 20 to control the swinging extension and retraction of the pivotal support arms. The switch 18 has a first position for advancing the cart, a second neutral or off position and a third position for returning the cart to the loading station. The switch 19 has a first position for raising the table top 5, a second off position and a third position for lowering the table top. The switch 20 has a first position for extending the pivotal support arms, a second off position and a third position for retracting the pivotal support arms. The alternate control panels allow the unloading station operator or the floor man at the loading station remotely to control the automatic movements of the transfer cart 1 during the loading, transfer and unloading sequences.

Figure 2:
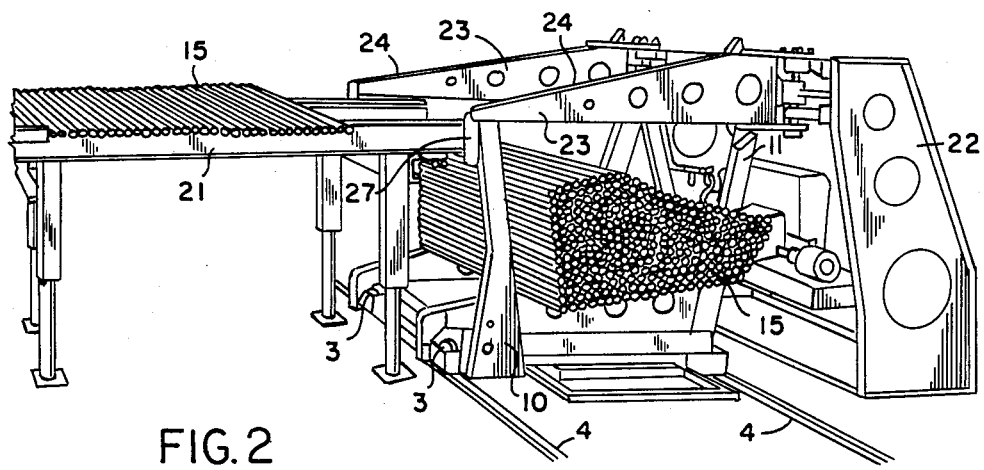
FIG. 2 is a perspective view showing the transfer cart transferred to the unloading station with the table top in its lowered position to locate the supported tube bundle beneath the extended arms on the unloading base.

Referring now to FIG. 2, the switch 18 has been moved to its first position to actuate a motor to drive the transfer cart 1 from the loading position of FIG. 1 to the unloading position of FIG. 2. The transfer cart rolls along and is guided by the rails 4 in its movement from the loading position to the unloading position.

As shown, the unloading station includes a gravity fed paint table 21. The paint table 21 is positioned on the left side of the track as viewed in the drawings. The paint table 21 cooperates with the unloading base 22 positioned on the opposite, right side of the track to unload the tubes 15 from cart 1. The upper end of the unloading base 22 is provided with two spaced arms 23 pivotally mounted thereon. The pivotal arms 23 respectively have inclined upper surfaces 24, with the slope of inclined surfaces 24 of arms 23 preferably matching the slope of inclined surfaces 9 on support arms 8 to assist in transferring the tubes therebetween. The arms 23 are pivoted about shafts 26 and are power driven between an extended position and a retracted position.

In the extended position, the arms are parallel with one another and extend over the track as shown in FIG. 2. The distal ends of support arms 23 respectively have stop rolls 27 depending downwardly therefrom which may engage the paint table 21 to limit their pivotal advancement. In the retracted position, the arms have been swung outwardly away from one another into diametrically opposed relationship and are thus positioned on the right side of the track as shown in FIG. 3.

Figure 3:
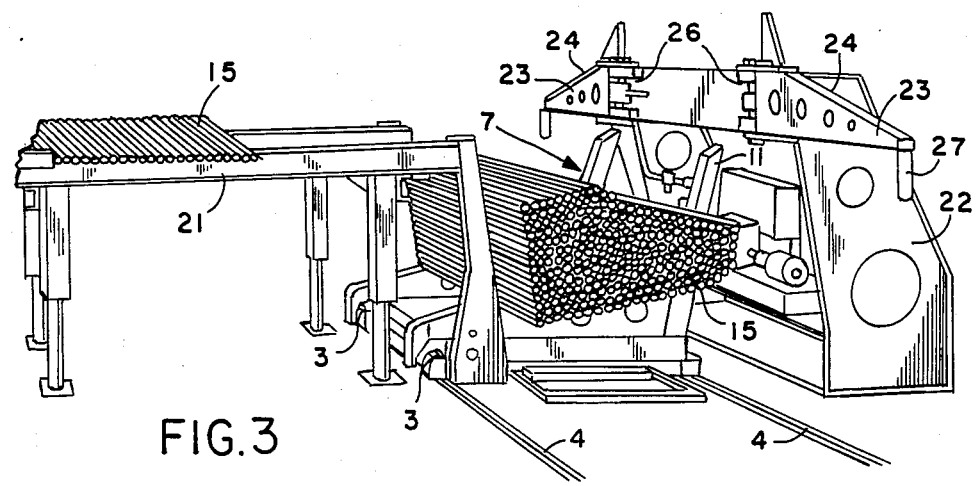
FIG. 3 is a perspective view similar to FIG. 2 showing the pivotal arms on the unloading base swung to their retracted position to provide vertical clearance above the vertically movable table top.

Referring now to FIG. 3, when the paint line requires additional elongated objects, switch 20 at one of the control panels is moved to its third position for swinging the pivotal support arms 23 into their retracted position. The retracted position of the pivotal arms 23 provides vertical clearance for the table top 5 of transfer cart 1. The operator may then actuate the table top control switch 19 to its first position to raise the table top 5 as shown in FIG. 4.

As scissor jack 6 raises the table top, the upstanding posts 11 mounted on the table top 5 are simultaneously raised, while the upstanding pair of posts 10 on the mobile base 2 remain stationary. When the table top reaches its elevated position, the tubes on the left side of the table top have just cleared the tops of the upstanding posts 10, while the right side of the tube bundle is still constrained by upstanding posts 11. The elevated tubes are also slightly above the inclined surfaces 24 on pivotal support arms 23. The inclined upper surfaces 9 of spaced support plates 8 provide an inclination for the entire tube bundle to assist in gravity feeding the tubes therefrom to the table 21.

As sequentially shown in FIGS. 4 and 5, when the table top is fully elevated, the operator then moves the arm control switch 20 to its first position simultaneously to swing the two arms 23 into their extended position respectively beneath the overhung ends of the tubes 15. In the extended arm position, lateral clearance exists between the upstanding posts and the arms to permit the table top to be lowered.

After the extended arms are in position to support the tubes, the operator actuates the table top control switch 19 to its third position to lower the table top onto mobile base 2. As the table top descends, the support of tubes 15 is entirely transferred to the extended arms 23 allowing the table top to be fully lowered. The inclined surfaces 24 on arms 23 cooperate with the inclined surfaces 9 on support plates 8 to enhance the transfer from cart 1 to arms 23 and to ehance the subsequent tube feed to table 21. The unloaded tubes 15 are free to roll downwardly along inclined surfaces 24 on arms 23 onto the end of table 21 as required.

Figure 7:
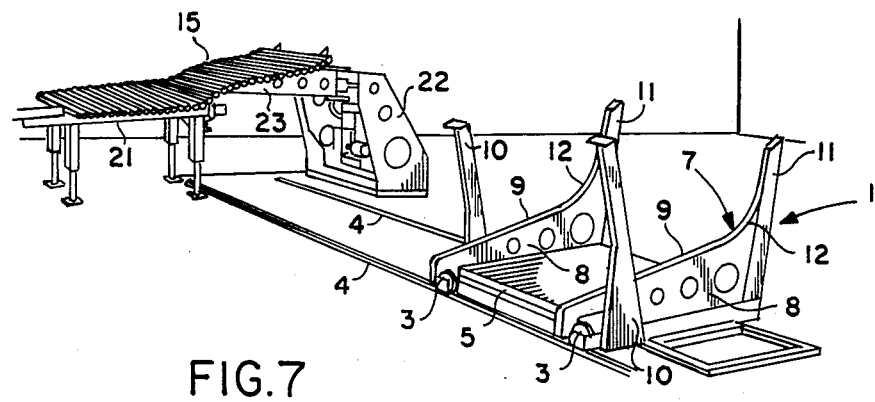
FIG. 7 is a perspective view showing the unloaded transfer cart returned to its loading position to begin another transfer sequence.

Cart control switches 18 is moved to its third position to actuate the motor to return the empty transfer cart 1 to the loading station as shown in FIG. 7. A complete transfer cycle has thus been performed and the apparatus is conditioned to initiate the next transfer cycle. By having two control panels, any step in the cycle can be initiated automatically from either location. This ability remotely to control any or all of the transfer steps from either location frees the respective operators for other functions and also reduces the amount of manpower and equipment required for the transfer process.

It will be apparent from the foregoing that changes may be made in the details of construction and configuration without departing from the spirit of the invention as defined in the following claims. For example, the posts and cradle slope could be reversed to unload objects to the other side of the transfer cart. The control panels 16 and 17 and the circuitry associated therewith can be readily modified to provide speed control over one or more of the system components. With speed control, the table top 5 can be slowly elevated to act as a gradual feeder to the unloading station. With the slower table top elevation, the elongated objects on the top of the bundle may sequentially roll onto the unloading station to provide a continuing gradual feed of elongated objects as the table top slowly ascends to its fully elevated position. The gradual feed of elongated objects may be preferred, for example, in transferring large and/or heavy objects such as larger diameter pipe. With the gradual feed, the pivotal arms 23 are either not used at all or are extending only when the table top is fully elevated with only a few elongated objects remaining thereon.

We claim:

1. A material transfer system for elongated objects comprising a transfer cart having a mobile base and a selectively vertically movable table top on the mobile base, said transfer cart being selectively reciprocally transferred between a loading station and an unloading station, cradle means on the transfer cart cooperating with the table top to hold the elongated objects on the table top from the loading station to the unloading station, with the elongated objects overhanging each end of the table top and pivotal support arms at the unloading station movable between two positions, the pivotal support arms in their first retracted position being out of the way of vertical table top movement to allow the table top and elongated objects thereon to be raised to a level above the level of the pivotal support arms, the pivotal support arms in their second extended position respectively being under the overhung ends of the elongated objects to allow the table top to be lowered with the elongated objects being unloaded onto the pivotal support arms to allow the transfer car with the lowered table top to return empty to the loading position.

2. The material transfer system of claim 1 wherein the cradle means includes a first pair of upstanding posts respectively mounted on one side of the mobile base at each end thereof and a second pair of upstanding posts respectively mounted on the table top adjacent each end thereof on an opposite side from the first pair of posts selectively to hold the elongated objects therebetween.

3. The material transfer system of claim 2 wherein the two pair of posts are substantially equal in height when the table top is at its lowest position but the second pair of posts is mounted on the table top to elevate with the table top to assist in orienting the elongated objects for subsequent transfer.

4. The material transfer system of claim 3 wherein the cradle means further includes two spaced base plates mounted on top of and at the ends of the table top to support the elongated objects placed thereon, the base plates having upper surfaces inclined upwardly from the table top adjacent the first pair of posts to the second pair of posts further to assist in orienting the elongated objects or subsequent transfer.

5. The material transfer system of claim 4 wherein the pivotal arms have inclined upper surfaces with approximately the same inclination as the upper surfaces of the base plates to allow the elongated objects to roll therealong for transfer when the pivotal support arms are in their second extended position.

6. The material transfer system of claim 5 further including guide means for the movement of the mobile base from the loading station to the unloading station and a work station positioned at the unloading station on the side of the guide means adjacent the first pair of posts when the transfer cart is at its unloading station, said work station receiving the elongated objects rolling off of the extended pivotal arms.

7. The material transfer system of claim 6 wherein a base frame supporting the pivotal arms is positioned on the opposite side of the guide means from the work means.

8. The material transfer system of claim 1 further including control means for remotely actuating the transfer cart, table top and pivotal support arms.

9. The material transfer system of claim 8 wherein the control means includes a control panel adjacent the unloading station and a control panel adjacent the loading station, with either control panel being operative selectively to control the remote movements of the transfer cart, table top and pivotal support arms.

10. A material transfer system for elongated objects comprising a transfer cart having a mobile base and a selectively vertically movable table top on the mobile base, said transfer cart being selectively reciprocally transferred between a loading station and an unloading station, cradle means on the transfer cart cooperating with the table top to hold the elongated objects in a bundle on the table top from the loading station to the unloading station, with the elongated objects overhanging each end of the transfer cart, the cradle means include supports to orient the elongated objects in the bundle for selective feed in one direction, pivotal support arms at the unloading station and control means selectively operative slowly to elevate the table top gradually to feed the elongated objects in sequence from the top of the bundle onto the unloading station as the table top ascends to its fully elevated position, the pitoval support arms being extended to a position under the overhung ends of the elongated objects after the table top reaches its fully elevated position to provide support for any elongated objects remaining thereon.

11. The material transfer system of claim 10 wherein the control means is selectively operative to lower the table top from its fully elevated position to transfer total support of the remaining elongated objects to the extended pivotal arms.

12. The material transfer system of claim 10 wherein the supports of the cradle means include first upstanding post means mounted on the mobile base on one side of the transfer cart and second upstanding post means mounted on the table top on the other side of the cart, whereby table top elevation will raise the tube bundle sequentially to clear the first upstanding post means from the top of the bundle to the bottom of the bundle for gradual feed thereover while the second post means on the table top constrains the other side of the tube bundle.

13. The material transfer system of claim 12 wherein the supports of the cradle means further include base support plates on the table top having upper surfaces inclined in the direction of unloading.

14. A method of transferring elongated objects comprising the steps of loading elongated objects at a loading station onto a transfer cart having a vertically movable table top, holding the elongated objects on the table top with the ends of the elongated objects overhanging both ends of the table top, advancing the transfer cart and table top from the loading station to an unloading station, raising the table top to an elevated position while holding the elongated objects on the table top, extending arms under the overhung ends of the elevated elongated objects, lowering the table top to leave the elevated elongated objects supported by the extended arms, returning the cart and lowered table top to the loading station, and transferring the elongated objects from the arms to a work station.

15. The method of claim 14 comprising the further step of retracting the arms after elongated object transfer to provide clearance for raising the table top in the next method cycle.

16. The method of claim 15 comprising the further step of orienting the elongated objects held into a sloped bundle to assist in transferring the elongated objects from the table top to the extended arms and from the extended arms to the work station.

17. The method of claim 16 comprising the further step of remotely controlling the method steps.

18. The method of claim 16 comprising the further step of remotely controlling any or all of the method steps from alternate locations.

19. A method of transferring elongated objects comprising the steps of loading elongated objects at a loading station onto a transfer cart having a vertically movable table top, positioning the elongated objects on the table top with the ends of the elongated objects overhanging each end of the table top, advancing the transfer cart with the elongated objects in a bundle thereon fromthe loading station to the unloading station, holding the bundle of elongated objects on the table top for selective feed in one direction, slowly raising the table top gradually unidirectionally to feed elongated objects from the top of the bundle onto the unloading station as the table top ascends, and extending pivotal support arms under the overhung ends of the elongated objects when the table top is fully elevated unidirectionally to feed any remaining elongated objects from the table top onto the unloading station.

* * * * *